UNITED STATES PATENT OFFICE.

ROY LINDEN HILL AND ARCHIBALD JACKSON STRANE, OF TAMAQUA, PENNSYLVANIA, ASSIGNORS TO ATLAS POWDER COMPANY, OF WILMINGTON, DELAWARE, A CORPORATION OF DELAWARE.

EXPLOSIVE COMPOUND.

15,155. Specification of Reissued Letters Patent. Reissued July 19, 1921.

No Drawing. Original No. 1,307,495, dated June 24, 1919, Serial No. 260,631, filed November 1, 1918. Application for reissue filed May 14, 1921. Serial No. 469,567.

*To all whom it may concern:*

Be it known that we, ROY LINDEN HILL and ARCHIBALD JACKSON STRANE, citizens of the United States of America, residing at Tamaqua, in the county of Schuylkill and State of Pennsylvania, have invented certain new and useful Improvements in Explosive Compounds, of which the following is a specification.

This invention relates to explosive mixtures and more particularly to those explosive mixtures known as "safety" mixtures, wherein a prime object is to render the explosive relatively safe in handling.

There is an extensive demand for explosives which do not contain nitroglycerin or other organic nitrates, these explosives being commonly known as "safety" powders. Widespread attempts have been made to satisfy the demand with explosives which contain ammonium nitrate as the principal ingredient. Among other ingredients that have been used are nitro-aromatics, combustible but not explosive carbonaceous materials, and various inorganic salts.

While explosives of the nature referred to present a great improvement over those containing an organic nitrate, as far as safety in handling is concerned, they frequently present the very great objection of lack of sensitiveness to the initial detonation and inability to propagate it. To offset this objection it has been necessary to take extensive precautions during the manufacture of the explosive with respect to the incorporation and freedom from moisture of the materials used and the methods of packing the same. While satisfactory explosives have been produced as a result of these precautions such explosives frequently become hard. This hardness results in an increased lack of sensitiveness, occasionally to the extent of failure to detonate even with the strongest caps.

We have found that we can prevent such explosives from becoming hard by introducing into their composition certain amounts of copper sulfate (varying from five-tenths to ten per cent.) from which the water of crystallization has been partly or completely removed. The copper sulfate may be added to any ingredient individually or to any mixture of ingredients which go to make up the finished explosive. We prefer to add it after all the other ingredients of the explosive have been partially mixed.

The dehydrating action of copper sulfate, particularly when the water of crystallization has been partially or wholly removed therefrom, is well known. This dehydrating agent acts to prevent the explosive to which it is added, from becoming hard or "set" by taking the moisture from the other ingredients of the explosive and combining it with itself as water of crystallization. In such a form this moisture is not in a condition to cause the explosives to become hard or set.

We believe that we are the first to incorporate in a hygroscopic explosive of the character indicated, a dehydrating agent from which the water of crystallization has been wholly or partially removed for the purpose of having such agent take up the moisture in the other elements of the explosive to prevent hardening of the finished product.

The following composition is illustrative of an embodiment of the invention but it is to be understood that the invention is not limited thereto because the copper sulfate may be advantageously employed in other compositions of a hygroscopic nature:

| | |
|---|---|
| Ammonium nitrate | 88 per cent. |
| Trinitrotoluene | 10 per cent. |
| Copper sulfate | 2 per cent. |

Having described our invention, what we claim is:

1. The herein described method of preventing the hardening of hygroscopic explosives which consists of incorporating a dehydrating agent therein.

2. A hygroscopic explosive having a dehydrating agent incorporated therein.

3. The herein described method of preventing the hardening of hygroscopic explosives which consists of incorporating a dehydrating agent therein from which the water of crystallization has been at least partly removed.

4. An explosive comprising a hygroscopic ingredient and copper sulfate.

5. The combination with an explosive containing a hygroscopic ingredient, of copper sulfate from which the water of crystallization has been at least partly removed.

6. The combination with an explosive of a hygroscopic nature, of copper sulfate from which the water of crystallization has been at least partly removed, whereby the moisture content of the explosive is caused to combine with the copper sulfate as water of crystallization.

7. The combination with an explosive of a hygroscopic nature, of from five-tenths per cent. to ten per cent. of copper sulfate from which the water of crystallization has been at least partly removed as and for the purposes set forth.

8. The combination with an explosive of a hygroscopic nature, of a dehydrating agent from which the water of crystallization has been at least partly removed whereby the moisture content of the explosive is caused to combine with the dehydrating agent as water of crystallization.

9. An explosive comprising copper sulfate and ammonium nitrate as its principal ingredient.

10. An explosive comprising copper sulfate and ammonium nitrate as its principal ingredient and which is free of organic nitrate.

11. An explosive comprising copper sulfate from which the water of crystallization has been removed and ammonium nitrate.

ROY LINDEN HILL.
ARCHIBALD JACKSON STRANE.